US010408949B2

(12) United States Patent
Jiang et al.

(10) Patent No.: US 10,408,949 B2
(45) Date of Patent: Sep. 10, 2019

(54) INDIRECT PHOTON-COUNTING ANALYTICAL X-RAY DETECTOR

(71) Applicant: Bruker AXS, Inc., Madison, WI (US)

(72) Inventors: Hao Jiang, Madison, WI (US); Joerg Kaercher, Madison, WI (US); Roger D. Durst, Pfinztal (DE)

(*) Notice: Subject to any disclaimer, the term of this patent is extended or adjusted under 35 U.S.C. 154(b) by 0 days.

(21) Appl. No.: 16/047,731

(22) Filed: Jul. 27, 2018

(65) Prior Publication Data
US 2019/0056514 A1    Feb. 21, 2019

Related U.S. Application Data

(60) Provisional application No. 62/546,900, filed on Aug. 17, 2017.

(51) Int. Cl.
*G01T 1/20* (2006.01)
*G01T 1/36* (2006.01)

(52) U.S. Cl.
CPC .......... *G01T 1/2006* (2013.01); *G01T 1/2002* (2013.01); *G01T 1/2018* (2013.01); *G01T 1/362* (2013.01)

(58) Field of Classification Search
CPC ... G01T 1/2002; G01T 1/2006; G01T 1/2018; G01T 1/362
See application file for complete search history.

(56) References Cited

U.S. PATENT DOCUMENTS

| 5,818,900 | A | 10/1998 | Vogelsong et al. |
| 8,124,938 | B1* | 2/2012 | Tseng ............... H01L 27/14618 250/208.1 |
| 2009/0242775 | A1* | 10/2009 | Beekman ............. G01T 1/1611 250/363.04 |
| 2012/0126130 | A1* | 5/2012 | Svenonius ............. G06T 5/002 250/369 |
| 2015/0003584 | A1 | 1/2015 | Weisfield et al. |

OTHER PUBLICATIONS

Jiang, Hao, "Indirect-detection single-photon-counting x-ray detector for breast tomosynthesis", Proceedings of Spie, vol. 9783, Mar. 22, 2016.

* cited by examiner

*Primary Examiner* — Mark R Gaworecki
(74) *Attorney, Agent, or Firm* — Benoit-Côté Inc.

(57) ABSTRACT

An indirect, photon-counting X-ray detector capable of detecting the low-energy X-rays includes a scintillator screen that is directly coupled to a two-dimensional optical sensor. A signal filter receives an electrical output signal from the optical sensor and removes high intensity signal contributions therefrom that are indicative of direct interaction between said X-ray signal and said optical sensor. The scintillator screen has a sufficient thickness to ensure a high absorption of incident X-ray photons, and uses phosphor grains with a relatively small grain size. A cooling apparatus in thermal communication with the optical sensor may be used to control its temperature. The signal filter maintains a running average of changes in measured pixel output values for consecutive measurements, and replaces a measured value caused by a direct interaction event with a value equal to a previous measured value plus said running average.

15 Claims, 3 Drawing Sheets

Δ1 = Frame 2 - Frame 1
Δ2 = Frame 3 - Frame 2
Δ3 = Frame 4 - Frame 3
Δ4 = Frame 5 - Frame 4

INDIRECT PHOTON-COUNTING ANALYTICAL X-RAY DETECTOR

BACKGROUND OF THE INVENTION

Field of the Invention

This invention relates generally to the field of X-ray detector for analytical instruments and, more specifically, to a detector using an indirect conversion screen.

Description of the Related Art

Hybrid pixel array detectors (HPADs) are known in the art and offer near quantum limited performance. In an HPAD, a semiconductor sensor (typically silicon or CdTe) is bump bonded to a readout ASIC (application-specific integrated circuit). Each X-ray that is incident on the detector then produces a charge cloud which is amplified and compared to a binary threshold. If the resultant pulse exceeds the threshold it is counted as an X-ray. If it falls below the threshold it is neglected (assumed to be noise). In this way, most of the detector noise including read noise (also known as kTC noise) and dark current shot noise can be excluded from the final signal. This type of operation is known as "photon counting" and has achieved wide application in a number of areas. However, conventional HPADs have a number of undesirable characteristics which limit their potential application.

Shown in FIG. 1 is a schematic view of a conventional HPAD. In such a configuration, a scintillator screen 10 is positioned on a fiber optic faceplate 12 that couples light emitted from the scintillator to a CMOS sensor 14. The sensor 14 converts the detected light into electrical signals that are conveyed by signal output 16 to an analysis device, such as a computer. The sensor 14 is in contact with a cooling apparatus 18 that maintains it at a relatively low temperature.

Using existing technology, individual sensor-ASIC packages are limited to sizes on the order of a few centimeters or less. This means that a large detector can only be produced by "tiling" a large number of small sensors together with gaps between them. These gaps lead to loss of information which is undesirable or unacceptable in some applications.

Another important limitation of HPADs derives from the use of silicon sensors. For higher energies (above about 12-15 keV) the absorption lengths of X-rays in silicon become large, and thus the signal from X-rays that are incident at an oblique angle are smeared by parallax. Parallax may be avoided through the use semiconductors with higher mean atomic number (Z) such as, for example, cadmium telluride (CdTe) or cadmium zinc telluride (CZT). Indeed, these higher-Z semiconductors are under active development for medical and non-destructive testing applications.

However, for applications in analytical X-ray diffraction, these materials are not ideal since they suffer from polarization which causes the effective conversion efficiency to decrease with time. This drift in quantum efficiency is a crucial disadvantage in X-ray diffraction in which hundreds or even thousands of discrete exposures must be acquired. If the response varies with time, the consolidation of these multiple frames is degraded.

SUMMARY OF THE INVENTION

In accordance with the present invention, a two-dimensional, indirect photon-counting X-ray detector is provided that is capable of indirect detection of low-energy X-rays in photon-counting mode. The detector has a scintillator screen that absorbs an incident X-ray signal in a two-dimensional detection area, and emits an optical signal having a common spatial distribution with the incident X-ray signal. A two-dimensional optical sensor is coupled directly to the scintillator screen and detects the optical signal emitted thereby, generating an electrical output signal that is indicative of the spatial distribution of the detected optical signal. The electrical signal is received by a signal filter that removes high intensity signal contributions therefrom that are indicative of direct interaction events between the X-ray signal and the optical sensor and that might otherwise distort the output signal.

In an exemplary embodiment of the invention, the scintillator screen has a sufficient thickness to ensure an absorption of 99.9% of incident X-ray photons. In one variation, the incident X-ray photons have an energy in the range of 5-12 keV, and the scintillator screen comprises one of terbium-doped gadolinium oxysulfide ($Gd_2O_2S$:Tb) with a thickness of 30-40 µm, and cesium iodide (CsI) with a thickness of 60-80 µm. In another variation, the scintillator screen has phosphor grains with a maximum mean grain size of 4 µm. The optical sensor may be a complementary metal oxide semiconductor (CMOS) sensor with a two-dimensional pixel array, and the pixels may be between 50 µm and 150 µm in diameter. The optical sensor may be operated in non-destructive readout mode, and a cooling apparatus may be used that is in thermal communication with the optical sensor so as to maintain the sensor within a predetermined operating temperature range.

The detector may be operated such that a plurality of sequential non-destructive measurements of the sensor are time-averaged to produce a low-noise background frame, and a subsequent frame is subtracted therefrom to determine whether one or more X-ray photons were absorbed by the scintillator screen. In one variation of the invention, the optical sensor collects sequential frames using a two-dimensional pixel array, and the signal filter removes large, discontinuous signal increases in the outputs of the pixel array. To ensure that only undesired signals are removed, the signal filter may remove a large, discontinuous signal increase only when its duration is less than a predetermined period of time. The signal filter, which may include a field-programmable gate array (FPGA), may also maintain a running average of changes in measured pixel output values for consecutive measurements, and replace a measured value that is identified as one of said high intensity signal contributions with a value equal to a previous measured value plus said running average.

DESCRIPTION OF THE INVENTION

The present invention overcomes the limitations of prior art detectors by providing an indirect X-ray detector that operates in photon-counting mode, and that is capable of detecting the low-energy X-rays (i.e., below about 30 keV) from a typical analytical application. The detector includes a scintillator screen that converts a received X-ray signal to visible light, which is, in turn, detected by a photodetector.

The mean quantum gain in an indirect detector is given by:

$$G = g_s q_d E \quad (1)$$

Where G is the quantum gain of the indirect detector (electrons per incident X-ray), $g_s$ is the quantum gain of the scintillator screen (photons/eV), $q_d$ is the quantum efficiency of the detector (electrons/photon) and E is the energy of the incident X-ray (eV). Therefore, the signal-to-noise ratio (SNR) of the detector at a given X-ray energy is given by:

$$SNR = \frac{g_s q_d E}{n_d} \quad (2)$$

where $n_d$ is the total noise of the detector (read noise, dark current shot noise, etc.).

In order to count individual X-ray photons, they must be clearly discernable above the noise floor. Thus, a signal-to-noise ratio preferably greater than 6-8 is typically necessary. From equation (2) above we can see that the signal-to-noise ratio (SNR) is a function of the X-ray energy.

To allow reliable photon-counting operation in the low energy range of 5-30 keV, as necessary for analytical X-ray detection, the present invention maintains a very low SNR. A first aspect of the detector that helps maintain this low SNR is the use of a real-time signal subtraction method that reduces the noise by a factor of 2-3. The detector is operated in non-destructive readout mode, and is cooled to minimize heat related noise. Typically, the dark current decreases by a factor of two for a 5-6° C. decrease in temperature. In the present invention, the sensor is cooled by about 40-60° C. to provide low-noise operation and allow good photon counting operation.

Figure 1:
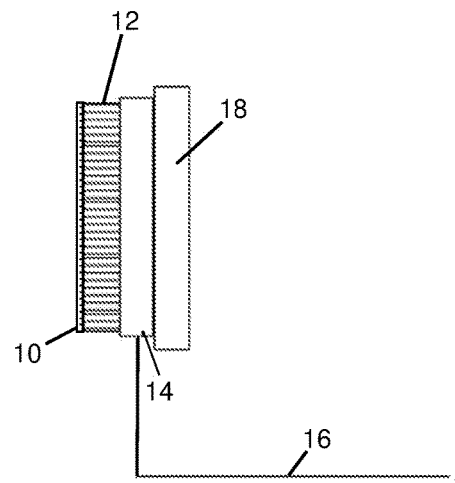
FIG. 1 is a schematic view of an X-ray detector according to the prior art.
Figure 2:
FIG. 2 is a representation of a frame subtraction method used with the present invention.
Figure 6:
FIG. 6 is a representation of a subframe organization of pixel data used with the present invention.

In practice, the detector uses several time-adjacent frames to yield a very low noise background frame. In particular, a first frame is subtracted from a subsequent frame, which removes the pixel reset noise. The signal-to-noise ratio of photon energies of interest is therefore high enough that single photons can be discerned. The general idea of such a frame subtraction method is depicted in FIG. 2, and one specific implementation is discussed in more detail below in conjunction with FIG. 6. FIG. 2 shows a sequence of sub-sub frames, and the general principle of how changes in the image frames Δ1, Δ2, etc. are calculated by the subtraction of a frame from a subsequent frame. This is similar in concept to the technique of correlated double sampling (CDS) but differs in that it is applied to a series of non-destructively read frames.

Figure 3:
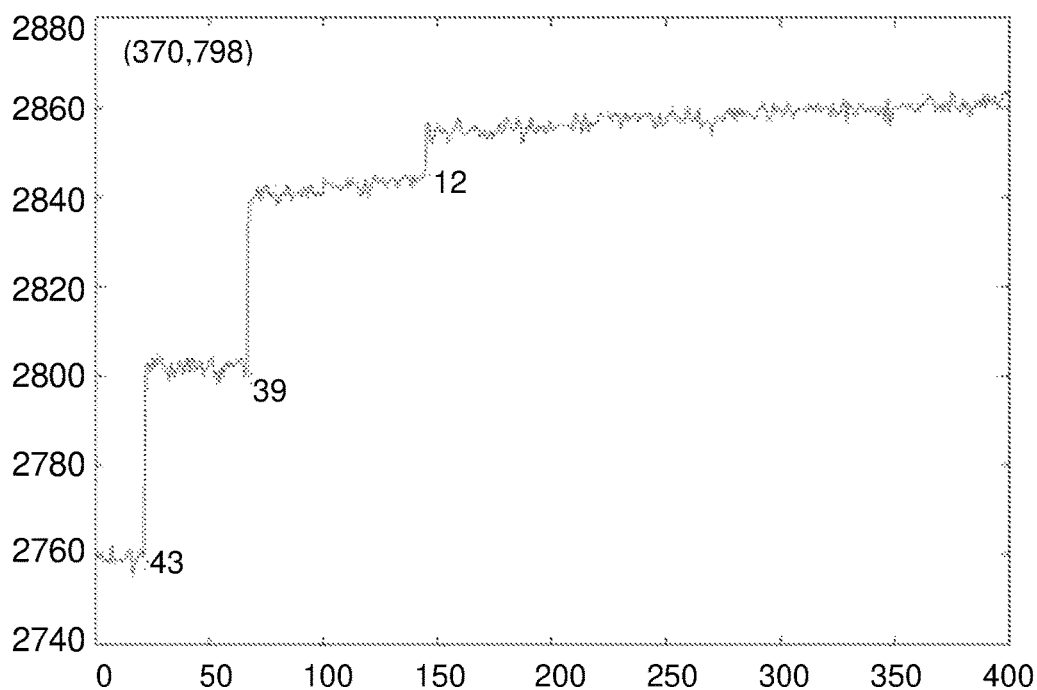
FIG. 3 a graphical representation of three distinctive photon counting (SPC) events of one pixel in a sequence of non-destructive readout (NDR) frames.

FIG. 3 is a plot showing three distinctive single photon counting (SPC) events of one pixel of a detector according to the present invention in a sequence of non-destructive readout frames. In the figure, the horizontal axis is time, while the vertical axis represents the output corresponding to a single pixel readout in non-destructive readout mode. As can be seen, three distinctive jumps in the signal, corresponding to X-ray events, indicate that single photon counting (SPC) events can be very well separated from sensor noise floor.

To further improve the signal-to-noise level, a scintillator is used that has a phosphor material with high energy conversion efficiency, such as $Gd_2O_2S:Tb$, $CsI(Tl)$, $Zn(Cd)S:Ag$ or $ZnSe(Te)$. For a given scintillator material, the scintillator thickness and the size of the phosphor grains are selected to maximize the quantum efficiency. A thinner screen provides a higher light output due to less light absorption in the scintillator, but it will also absorb fewer X-rays. Thus, these two effects are balanced to achieve the desired quantum gain.

The detector quantum efficiency, $q_s$, may be increased by increasing the fill factor of the detector pixels and by managing the optical interface between the scintillator screen and the sensor. In conventional systems, a fiber optic faceplate is typically used between the scintillator screen and the detector. This fiber optic plate absorbs X-rays that are not absorbed by the scintillator screen and, without such a faceplate, any X-rays that pass through the scintillator screen would be absorbed by the detector, and would produce a signal that is much larger than the gain from the scintillator. Such direct interaction events would effectively degrade the Swank factor, which indicates how much the detector deviates from an ideal response, and would thus represent a significant noise source.

Although the fiber optic plate prevents direct absorption of the X-rays by the detector, the plate itself can add significant noise to the system which, in practice, makes it impossible to perform photon counting at low X-ray energies. In particular, the plate reduces the signal which decreases the signal-to-noise ratio. In addition, the plate is not perfectly uniform, and there is spatial structure in the plate that increases noise (such as broken fibers), and there are often black fibers that are included to reduce scattered light. Finally, radioactive atoms in the plate can cause spurious signals (typically due to $^{232}Th$, which is an unavoidable trace contaminant in the $La_2O_3$ glass used in fiber optics). In practice, the fiber optic plate typically absorbs about 30% of the light output from the scintillator screen. Thus, using the plate reduces the effective quantum efficiency by about 30%, but prevents direct interaction noise that would otherwise lower the signal-to-noise ratio. The present invention, however, forgoes the use of such a plate, and instead uses the design of the scintillator screen to help reduce the direct interaction noise.

Figure 4:
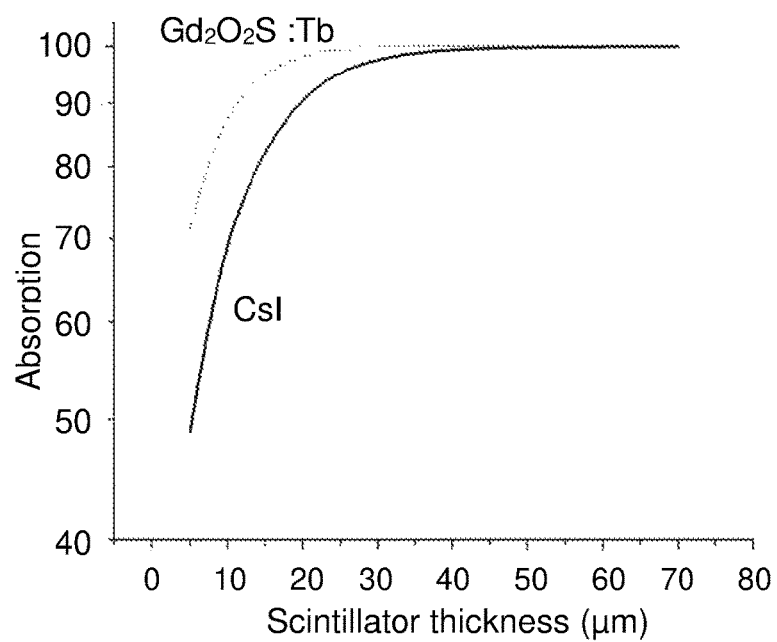
FIG. 4 is a graphical representation of absorption relative to scintillator thickness for two common scintillator materials.

The X-ray absorption of a scintillator screen can be calculated as:

$$A = e^{-\alpha t \rho}$$

where α is the attenuation coefficient of the scintillator, ρ is the effective mass density (including the packing fraction) and t is the thickness of the scintillator screen. FIG. 4 is a graphical depiction of the absorption percentage versus scintillator thickness for two typical scintillator materials, terbium-doped gadolinium oxysulfide ($Gd_2O_2S:Tb$) and cesium iodide (CsI). As shown, for both materials the absorption percentage increases rapidly with scintillator thickness, before leveling off at the maximum. For a scintillator of this type with an appropriate thickness, the maximum absorption rate is about 99.99%, which limits the rate of direct interaction events to less than $10^{-5}$, (i.e., the probability of an X-ray hit resulting in a direct interaction event is less than 1 in 100,000).

As the present invention omits the use of a fiber optic faceplate, a scintillator screen is provided that is thick enough to ensure an absorption of 99.99%. Thus, for example, operating in an energy range of 5-12 keV, the screen thickness of a $Gd_2O_2S:Tb$ scintillator is from 30-40 μm, while a scintillator using CsI would have a thickness of about 70 μm. Although it would be possible to reduce the direct interaction rate further by using an even thicker scintillation screen, the light yield would be correspondingly reduced by self-absorption in the thick screen. Moreover, the point spread of the signal would be increased in such a case by scattering in the thicker screen. Both of these effects would decrease the ability to distinguish single low-energy photons. Thus, a key aspect of the invention is to use a screen that is just thick enough to reduce the direct interaction rate to a manageable level, but not so thick as to compromise the light output or point spread function.

The scintillator screen of the invention is therefore much thinner than those used in medical radiography, which typically rely on scintillator materials having relatively large phosphor grain sizes (on the order of 5 µm or larger), as these grains give higher light output. For the thin screens discussed herein, however, such large phosphor grains would lead to inhomogeneity. Thus, the present invention makes use of a smaller mean grain size, on the order of 4 µm or smaller.

Even with the optimized scintillator screen as described above, there will still be some direct interaction events. Therefore, another aspect of this invention is to use filtration of high energy signals to remove direct interaction events. A direct interaction event causes a signal that is an order of magnitude larger than the signal from an X-ray which is absorbed in the scintillator screen. The present invention therefore uses a frame-by-frame analysis of the pixel output as described above, and removes direct interaction events from the data, which are identifiable by large discontinuous jumps in the output of a pixel in a given frame. This allows the detector to achieve a nearly ideal Swank factor and, thus, a nearly ideal signal-to-noise ratio. The combination of this post-filtration together with the optimized scintillator screen effectively removes the degradation of the Swank factor caused by direct interaction events, and therefore allows the detector to operate in photon counting mode without a fiber optic faceplate with no performance penalty.

Figure 5:
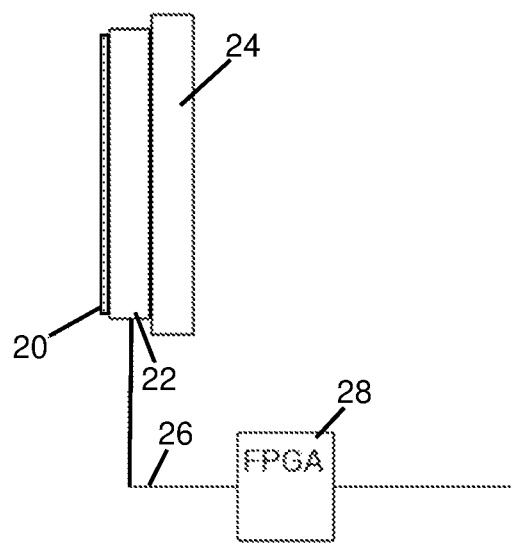
FIG. 5 is a schematic view of an X-ray detector according to the present invention.

FIG. 5 is a schematic view of a detector according to the present invention. As shown, a scintillator screen 20 is directly in front of a CMOS sensor 22, with no fiber optic faceplate between them. A cooling apparatus 24 is used to maintain the low temperature of the sensor 22 (as described above), and an output 26 of the sensor is coupled to a field-programmable gate array (FPGA) 28 which is, in turn, coupled to an analysis device, such as a computer.

In an exemplary embodiment of the invention, the detector uses a CMOS sensor with a large pixel size (in the range of 50-150 µm) a read noise of less than 30 electrons rms, and a fill factor greater than 60%. The CMOS sensor is operated in non-destructive readout mode at a high frame rate (>50 frames per second). In operation, several subsequent non-destructive reads of the sensor are time-averaged to reduce the effective noise in real time and produce a low-noise background frame. A subsequent frame is then subtracted from the time-averaged frames to discern X-ray hits (i.e., individual X-ray photons).

The scintillator screen of this embodiment is configured to allow the highest possible light yield, while limiting direct interaction events to a rate of less than 0.001%. Some examples of the screen are a $Gd_2O_2S$:Tb scintillator with a thickness of from 30-40 µm or a CsI scintillator having a thickness of about 60-80 µm, each having a packing fraction of greater than 70% and a grain size of 4 µm or less. No fiber optic faceplate is used with the scintillator, thus maximizing optical coupling between the scintillator and the sensor, and filtration of the high amplitude events is used to remove residual direct interaction events.

In this exemplary embodiment, the filtration of data attributed to direct interaction events is done by removing the affected data after its detection during data processing in FPGA 28. The sequence of sub-sub frames shown in FIG. 2 is processed by the FPGA and direct interaction events, due to their relatively high energy, are recognizable within the data stream. The use of the terminology "subframe" and "sub-sub frame" in the following description refers to how the individual frames being processed are organized relative to the overall exposure time for a pixel. For example, for an exposure time of two seconds, a detector operating at 70 frames-per-second would have 140 individual measurement periods. Within the context of the invention, these are organized into multiple sequences of a predetermined number of non-destructive frames followed by a destructive frame. To distinguish these groupings, the collection of all the measurements for a single exposure is referred to as a frame, each of the multiple sequences is referred to as a subframe and each member of a sequence is referred to as a sub-sub frame.

Direct interaction events are distinguished in the measured pixel values from the background and normal X-ray signals by comparing a pixel value increment to the mean values of increments for a finite number of previous sub-sub frames for that pixel. In the example shown in FIG. 6, each subframe consists of a sequence of seven sub-sub frames in which six nondestructive readout frames are followed by a destructive readout frame, although this organization of subframes and sub-sub frames is for descriptive purposes only, and the actual organization may vary. For each new sub-sub frame, a delta value is calculated that corresponds to the difference in the current measured value and a recorded value for the previous frame. This delta value is also used in the calculation of a running average, or mean, as well as in a determination of an overall variance of delta from the mean. The mean and variance values for delta are calculated over a fixed number of sub-sub frames immediately prior to the current sub-sub frame, and thereby represent a statistical average over a moving window of delta values. Thus, these values continue to change while pixel values are measured, and are used to determine a threshold deviation from the mean. When the delta value for a new pixel measurement exceeds the threshold, it indicates the occurrence of a direct interaction event, and the current mean value for delta is used to calculate the replacement value for that sub-sub frame.

In practice, the measured delta values represent the differences in pixel values from one sub-sub frame to the next. The first non-destructive sub-sub frame $N_1$ is just the measured pixel value (as no delta has yet been determined), and the pixel value for subsequent sub-sub frames will also be the measured value if there is no direct interaction event. That is, for each sub-sub frame after the first for which the direct interaction threshold for delta has not been exceeded, $N_2=N_1+\Delta_1$, $N_3=N_2+\Delta_2$ and so on. During this measurement timeframe, the mean value of delta is continuously calculated, as is its variance. When the delta threshold is exceeded for a given sub-sub frame, the pixel value that would have resulted is replaced by the previous pixel value plus the current delta mean. That is, the pixel value for sub-sub frame $N_x$ is set to $N_{x-1}+\Delta_{mean}$. In this way, the distorting effect of the direct interaction event is removed.

For each pixel of the detector array, FPGA 28 may be used to calculate the running average of delta as well as the running average of the variance. Delta values that are attributable to direct interaction events are omitted from the calculation of the averages and variances. Different calculations may be used to determine an appropriate threshold for identifying a direct interaction event. In the present example, the threshold is set to three times the square root of the current variance, such that a pixel measurement for a sub-sub frame that deviates by more than this value from the stored value for the previous sub-sub frame will be considered to have exceeded the threshold. A single instance of such a deviation can be used to trigger the replacement of this value by $N_{x-1}+\Delta_{mean}$ but, because there may be strong X-ray signals that exceed the threshold, it may be preferable to not perform a replacement if the higher measured value persists for more than a predetermined period of time. Direct interaction events are typically transient, and thus a strong signal that persists likely results from an actual X-ray detection. In the present example, therefore, there is no replacement of the measured value of a pixel if the threshold is exceeded for more than two consecutive sub-sub frames. In another variation of the invention, there is no replacement of the measured value of a pixel if the absolute signal value is well below that which would be expected for a direct interaction event, even if the threshold based on a large change in delta is exceeded. This prevents an errant replacement of an actual detected X-ray signal having low flux density.

This detector of the present invention overcomes several disadvantages of HPADs. In particular, large active areas are produced without gaps, high absorption screens are produced that effectively eliminate parallax, and the screen's conversion gain is very stable so that there are no drifts in the effective quantum conversion gain.

The invention claimed is:

1. A two-dimensional, indirect photon-counting X-ray detector for an analytical X-ray system comprising:
   a scintillator screen that absorbs an incident X-ray signal in a two-dimensional detection area and emits an optical signal in response thereto that has a common spatial distribution with the incident X-ray signal;
   a two-dimensional optical sensor coupled directly to the scintillator screen that detects said optical signal emitted thereby and collects sequential frames, the sensor generating an electrical output signal indicative of said spatial distribution of the detected optical signal; and
   a signal filter that receives the electrical output signal and removes high intensity signal contributions therefrom that are indicative of direct interaction between said X-ray signal and said optical sensor.

2. An X-ray detector according to claim 1 wherein the material and the thickness of the scintillator screen are sufficient to ensure an absorption of 99.9% of incident X-ray photons.

3. An X-ray detector according to claim 1 wherein the energy range of incident X-ray photons is in a range of 5-12 keV.

4. An X-ray detector according to claim 3 wherein the scintillator screen comprises terbium-doped gadolinium oxysulfide ($Gd_2O_2S$:Tb) with a thickness of 30-40 μm.

5. An X-ray detector according to claim 3 wherein the scintillator screen comprises cesium iodide (CsI) with a thickness of 60-80 μm.

6. An X-ray detector according to claim 1 wherein the scintillator screen comprises phosphor grains having a maximum mean grain size of 4 μm.

7. An X-ray detector according to claim 1 wherein the optical sensor comprises a complementary metal oxide semiconductor (CMOS) sensor having a two-dimensional pixel array.

8. An X-ray detector according to claim 7 wherein pixels of the pixel array have a size of between 50 μm and 150 μm.

9. An X-ray detector according to claim 1 further comprising a cooling apparatus in thermal communication with the optical sensor that maintains the sensor within a predetermined operating temperature range.

10. An X-ray detector according to claim 1 wherein the optical sensor is operated in non-destructive readout mode.

11. An X-ray detector according to claim 10 wherein a plurality of sequential non-destructive measurements of the optical sensor are time-averaged to produce a low-noise background frame, and a subsequent frame is subtracted therefrom to determine whether one or more X-ray photons were absorbed by the scintillator screen.

12. An X-ray detector according to claim 1 wherein the optical sensor collects said sequential frames using a two-dimensional pixel array and wherein the signal filter removes said high intensity signal contributions from the outputs of pixels of the pixel array.

13. An X-ray detector according to claim 12 wherein the signal filter removes a high intensity signal contribution only when its duration is less than a predetermined period of time.

14. An X-ray detector according to claim 12 wherein the signal filter maintains a running average of changes in measured pixel output values for consecutive measurements, and replaces a measured value that is identified as one of said high intensity signal contributions with a value equal to a previous measured value plus said running average.

15. An X-ray detector according to claim 12 wherein the signal filter comprises a field-programmable gate array (FPGA).

\* \* \* \* \*